(12) United States Patent
Hughes et al.

(10) Patent No.: US 11,337,561 B2
(45) Date of Patent: May 24, 2022

(54) NOZZLES USEFUL FOR SHOWER SYSTEMS (71) Applicant: Justrite Manufacturing Company L.L.C., Des Plaines, IL (US)

(72) Inventors: Anthony Douglas Hughes, Cheshire (GB); Neil Sholes, Cheshire (GB)

(73) Assignee: Justrite Manufacturing Company L.L.C., Des Plaines, IL (US)

( * ) Notice: Subject to any disclaimer, the term of this patent is extended or adjusted under 35 U.S.C. 154(b) by 0 days.

(21) Appl. No.: 15/331,593

(22) Filed: Oct. 21, 2016

(65) Prior Publication Data

US 2017/0113239 A1 Apr. 27, 2017

(30) Foreign Application Priority Data

Oct. 23, 2015 (GB) ...................................... 1518802

(51) Int. Cl.
*A47K 3/28* (2006.01)
*E03C 1/02* (2006.01)
(Continued)

(52) U.S. Cl.
CPC .............. *A47K 3/286* (2013.01); *B05B 1/185* (2013.01); *B05B 15/65* (2018.02); *E03C 1/025* (2013.01);
(Continued)

(58) Field of Classification Search
CPC ......... B05B 1/18; B05B 15/40; B05B 15/654; F16L 37/252; F16L 37/248; F16L 27/082;
(Continued)

(56) References Cited

U.S. PATENT DOCUMENTS 3,912,171 A 10/1975 Johnson
3,948,545 A * 4/1976 Bonds .................. E21B 17/085
285/4
(Continued)

FOREIGN PATENT DOCUMENTS

DE 3632005 A1 4/1988
FR 1487141 A 6/1967
(Continued)

OTHER PUBLICATIONS

World Intellectual Property Office, International Search Report in International Application No. PCT/IB2016/056361 dated Jan. 19, 2017, 6 pages.
(Continued)

*Primary Examiner* — Cody J Lieuwen
*Assistant Examiner* — Kevin Edward Schwartz
(74) *Attorney, Agent, or Firm* — Leydig, Voit & Mayer, Ltd.

(57) ABSTRACT

A shower nozzle assembly includes a shower nozzle, a nozzle attachment, and a bayonet connector. The shower nozzle has a water inlet opening and a water outlet part spaced from the water inlet opening, with the water outlet opening being configured to direct a flow of water out of the shower nozzle. The nozzle attachment has a through bore configured to receive the water outlet part therein. The bayonet connection is operative to secure the nozzle attachment to the shower nozzle, and includes a radial projection and a female bayonet receptor part configured to receive the radial projection therein to secure the shower nozzle to the nozzle attachment.

14 Claims, 11 Drawing Sheets

(51) Int. Cl.
  *B05B 15/65* (2018.01)
  *B05B 1/18* (2006.01)
  *F16L 37/248* (2006.01)
  *F16L 37/48* (2006.01)
  *E03C 1/06* (2006.01)

(52) U.S. Cl.
  CPC ............. *F16L 37/248* (2013.01); *F16L 37/48* (2013.01); *E03C 1/06* (2013.01)

(58) Field of Classification Search
  CPC ......... Y10T 403/7005; Y10T 403/7007; Y10T 403/7015
  USPC ........................................ 285/376, 401, 402
  See application file for complete search history.

(56) References Cited

U.S. PATENT DOCUMENTS

| 4,491,060 | A | * | 1/1985 | Boski | ................ | F16J 13/12 |
| | | | | | | 251/63.6 |
| 4,550,967 | A | * | 11/1985 | Riches | ............... | H01R 13/6278 |
| | | | | | | 439/332 |
| 4,611,662 | A | * | 9/1986 | Harrington | ........... | E21B 17/046 |
| | | | | | | 166/242.6 |
| 4,668,119 | A | * | 5/1987 | Galletti | .................. | E02D 5/285 |
| | | | | | | 403/343 |
| 7,806,348 | B2 | * | 10/2010 | Kline | ....................... | B05B 1/18 |
| | | | | | | 239/478 |
| 8,864,049 | B2 | * | 10/2014 | Nolte | .................... | B05B 3/1042 |
| | | | | | | 239/223 |
| 8,888,020 | B2 | * | 11/2014 | Huang | ..................... | B05B 1/18 |
| | | | | | | 239/428.5 |
| 10,359,140 | B2 | * | 7/2019 | Flynn | .................... | F16L 37/505 |
| 2015/0076254 | A1 | * | 3/2015 | Farley | .................. | B05B 1/1636 |
| | | | | | | 239/532 |

FOREIGN PATENT DOCUMENTS

| WO | 2009/146410 A1 | 12/2009 |
| WO | 2009/158156 A1 | 12/2009 |

OTHER PUBLICATIONS

Intellectual Property Office, United Kingdom Search Report in Application No. GB1518802.2, dated Mar. 15, 2016.

* cited by examiner

NOZZLES USEFUL FOR SHOWER SYSTEMS

CLAIM OF PRIORITY

This patent application claims the benefit of priority to Great Britain Patent Application No. 1518802.2, filed on Oct. 23, 2015, the entire contents of which are incorporated by reference herein in its entirety.

TECHNICAL FIELD

This patent disclosure relates generally to nozzles and, more particularly, though not exclusively, nozzles for showers.

BACKGROUND

Emergency shower systems must provide effective and reliable emergency washing capabilities. Accordingly, they are typically required, by regulation, to output a minimum, or a specified, rate of water flow in use. This specified rate must be the rate as measured when the emergency shower system has in place the shower nozzle which will be used in the general emergency use of the shower.

This means that it is important to be able to accurately measure the rate of water flow in an emergency shower system in order to ensure that it will properly perform its function when needed in an emergency. Such a measurement is typically performed by directly collecting all of the water output from the shower when operated constantly for a specified collection period of time. The measured flow rate is then determined by dividing the collected volume of water by the collection period. Attempting to accurately collect all of the water output from a fully-assembled and ready-to-use emergency shower system can be extremely messy and difficult. This is because a shower unit necessarily produces a shower of water at a height typically of at least six feet (e.g., sufficient height to enable a man to stand underneath the shower head in use). Water emanating from the shower head can be difficult to collect hilly for measurement and some may be lost, rendering any water flow rate measurements highly inaccurate. Persons attempting to measure the flow rate may also become wet during the process.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

In one aspect, a shower nozzle assembly includes a shower nozzle, a nozzle attachment, and a bayonet connector. The shower nozzle has a water inlet opening and a water outlet part spaced from the water inlet opening, with the water outlet opening being configured to direct a flow of water out of the shower nozzle. The nozzle attachment has a through bore configured to receive the water outlet part therein. The bayonet connection is operative to secure the nozzle attachment to the shower nozzle, and includes a radial projection and a female bayonet receptor part configured to receive the radial projection therein to secure the shower nozzle to the nozzle attachment.

In another aspect, a kit of parts includes a shower nozzle and a nozzle attachment. The shower nozzle includes a water outlet part for directing a flow of water out of the nozzle, and the water outlet part includes an outer surface with a projection extending radially therefrom. The nozzle attachment includes a through bore and a female bayonet receptor part, with the through bore being configured to receive the water outlet part therein and the female bayonet receptor part comprising a longitudinal slot and a circumferential slot. Each slot being configured to receive the radial projection when the water outlet part is inserted into the through bore of the nozzle attachment.

In still another aspect, a shower nozzle is interconnectable to an attachment, with the attachment including a first portion of a bayonet connector. The bayonet connector is configured to fluidly interconnect the shower nozzle and the attachment. The shower nozzle includes a water inlet opening and a water outlet part spaced from the water inlet opening, with the water outlet opening being configured to direct a flow of water out of the shower nozzle. The shower nozzle further includes a second portion of the bayonet connector, with the first portion and the second portion of the bayonet connector being configured to interact to secure the shower nozzle to the attachment.

Further and alternative aspects and features of the disclosed principles will be appreciated from the following detailed description and the accompanying drawings. As will be appreciated, the hydraulic valves, hydraulic circuits, and methods for controlling hydraulic fluid disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DESCRIPTION OF EMBODIMENTS

Embodiments of a shower nozzle and attachments constructed in accordance with principles of the present disclosure are adapted to improve and simplify the operation of shower systems. Embodiments of a shower nozzle and attachments constructed in accordance with principles of the present disclosure can be used with emergency shower systems and can provide enhanced functionality and flexibility for operation of the system.

FIGS. 1-4 illustrate a shower nozzle 1 comprising a water inlet opening 2 for receiving a glow of water into the nozzle. The water inlet opening 2 is in fluid communication with a water outlet part 3 for directing a flow of water out of the nozzle and terminating at a water outlet opening. The water outlet part 3 includes a portion of a bayonet connector and includes an outer surface defining a male slide part of the bayonet connector for insertion into a female bayonet receptor part of a nozzle attachment 5. The outer surface of the water outlet part 3 is generally cylindrical and comprises a pair of diametrically opposed projections or pins 4 which each extend radially outward from the outer surface.

The nozzle attachment 5 comprises a cylindrical body defining a hollow through bore serving as the female receptor part. The walls of the through bore comprise a pair of slots 6. The slots 6 include a portion that extends longitudinally along the cylindrical walls of the nozzle attachment 5 from the uppermost or endmost circular edge of the nozzle attachment defining the opening of the through bore. An end portion of each of the slots 6 intersects with a circumferential slot or serif 7 for receiving a respective one of the two bayonet pins 4 when the water outlet part 3 is inserted into the through bore of the nozzle attachment 5. Thus, the through bore defines a portion of the female bayonet receptor part of the nozzle attachment 5. The two slots 6 are located at diametrically opposed positions within the walls of the nozzle attachment 5 so as to face one another across the through bore.

By inserting the water outlet part 3 of the shower nozzle 1 into the through bore of the nozzle attachment 5 such that the two pins 4 slide into and along the longitudinal length of a respective one of the slots 5, and subsequently relatively rotating the nozzle attachment with respect to the nozzle so as to slide the pins into the circumferential slots 7, the shower nozzle 1 and the nozzle attachment 5 can be connected to one another in the manner of a bayonet connection. This places the nozzle 1 in fluid communication with the through bore of the nozzle attachment 5.

Figure 1:
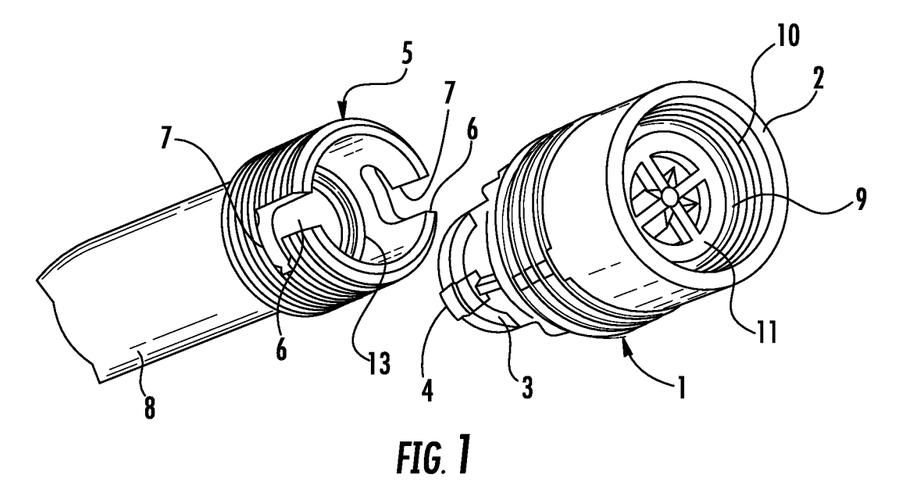
FIG. 1 illustrates a shower nozzle and a nozzle attachment according to an embodiment of the invention.
Figure 2:
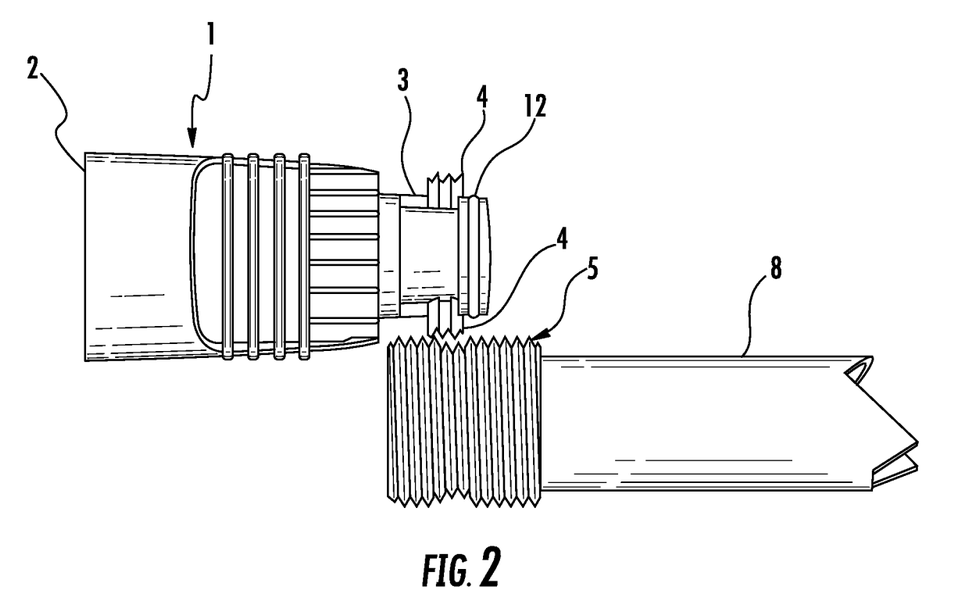
FIG. 2 illustrates a side view of the shower nozzle and nozzle attachment of FIG. 1.
Figure 3:
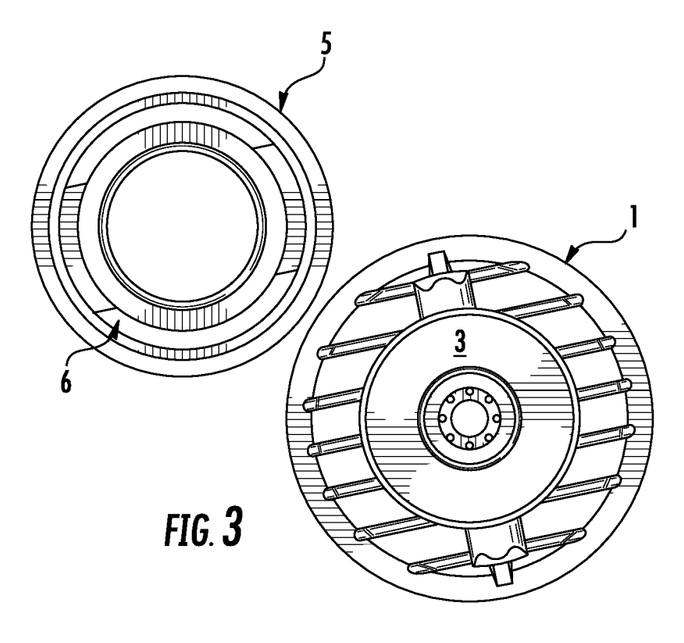
FIG. 3 illustrates the shower nozzle and nozzle attachment of FIG. 1 in a view in which the water outlet ends are visible.
Figure 4:
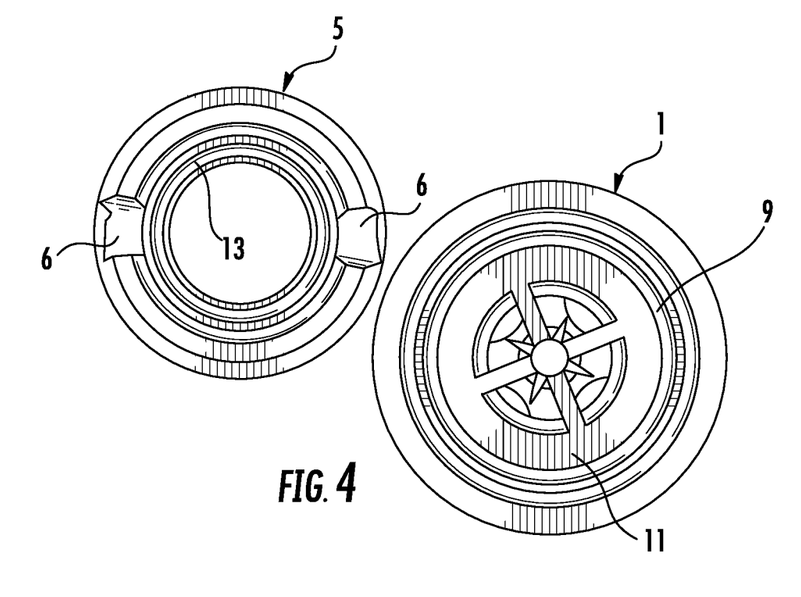
FIG. 4 illustrates the shower nozzle and nozzle attachment of FIG. 1 in a view in which the water inlet ends are visible.

A solid pipe 8, having a telescopically adjustable length, may be connected to the fluid outlet end of the through bore of the nozzle attachment 5. For clarity, only a portion of one end of the pipe 8 is shown in FIG. 1.

Figure 5:
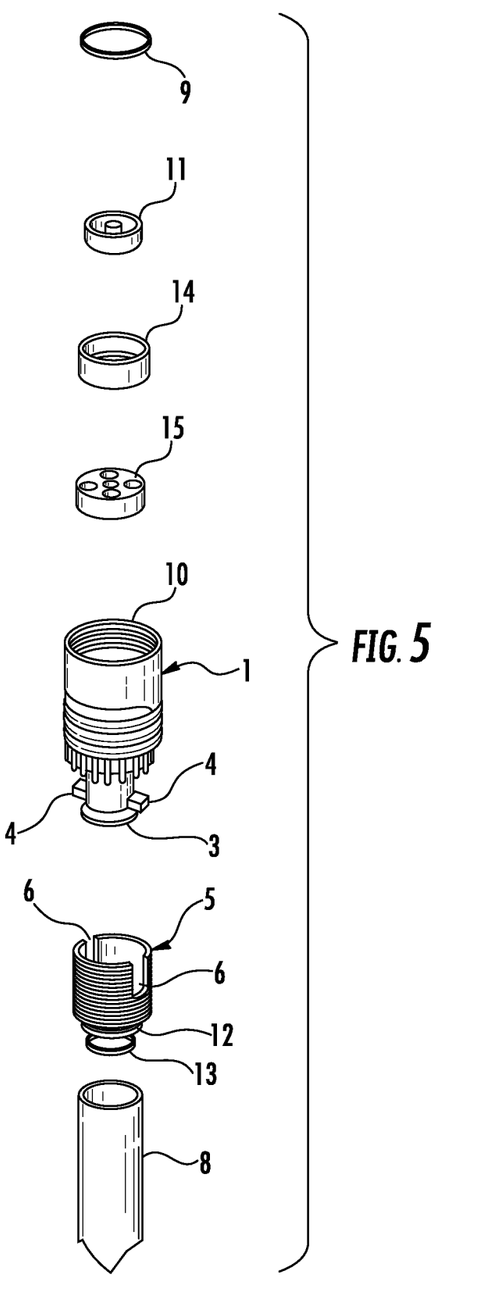
FIG. 5 illustrates an exploded view of the shower nozzle and nozzle attachment of FIG. 1.

Referring to FIG. 5, the internal bore of the shower nozzle 1 may contain fluid flow components as desired, and according to the particular needs of use of the shower nozzle. In the example illustrated, the shower nozzle 1 contains a fluid aerator part 11 arranged in direct fluid communication with the water inlet opening 2 of the nozzle together with a support member 14. The bore of the shower nozzle also contains a flow limiter 15 located between, and in fluid communication with, both the fluid aerator part 11 and the water outlet opening of the nozzle.

The shower nozzle also comprises a deformable sealing ring 9 formed of rubber or a suitably deformable elastomer material, which extends circumferentially along the base of the inner surface of the threaded inner wall 10 of the water inlet opening 2 immediately above (as viewed in FIG. 7) the fluid aerator 11. This sealing ring 9 serves to provide a watertight press-fit seal against the base of a threaded end of a water outlet pipe of a shower system (not shown) to which the nozzle is arranged to be connected via the internal threading 10 of the water inlet opening 2. Similarly, a second sealing ring 12 of similar type extends circumferentially around the outer cylindrical surface of the male slide part of the water outlet part 3 of the nozzle 1 and is arranged to be press-fit against or engage the internal wall of the through-bore of the nozzle attachment 5 when the nozzle 1 and nozzle attachment 5 are interconnected. A third deformable sealing ring 13 formed of rubber or a suitably deformable elastomer material is seated along an inner shoulder projecting partially into the through bore from the surface of the inner wall of the through bore of the nozzle attachment 5 immediately before (or above as viewed in FIG. 7) the fluid outlet end thereof. This sealing ring 13 serves to provide a watertight press-fit seal against the base of the water outlet part 3 of the nozzle 1 when the latter is connected to the nozzle attachment 5.

Figure 6:
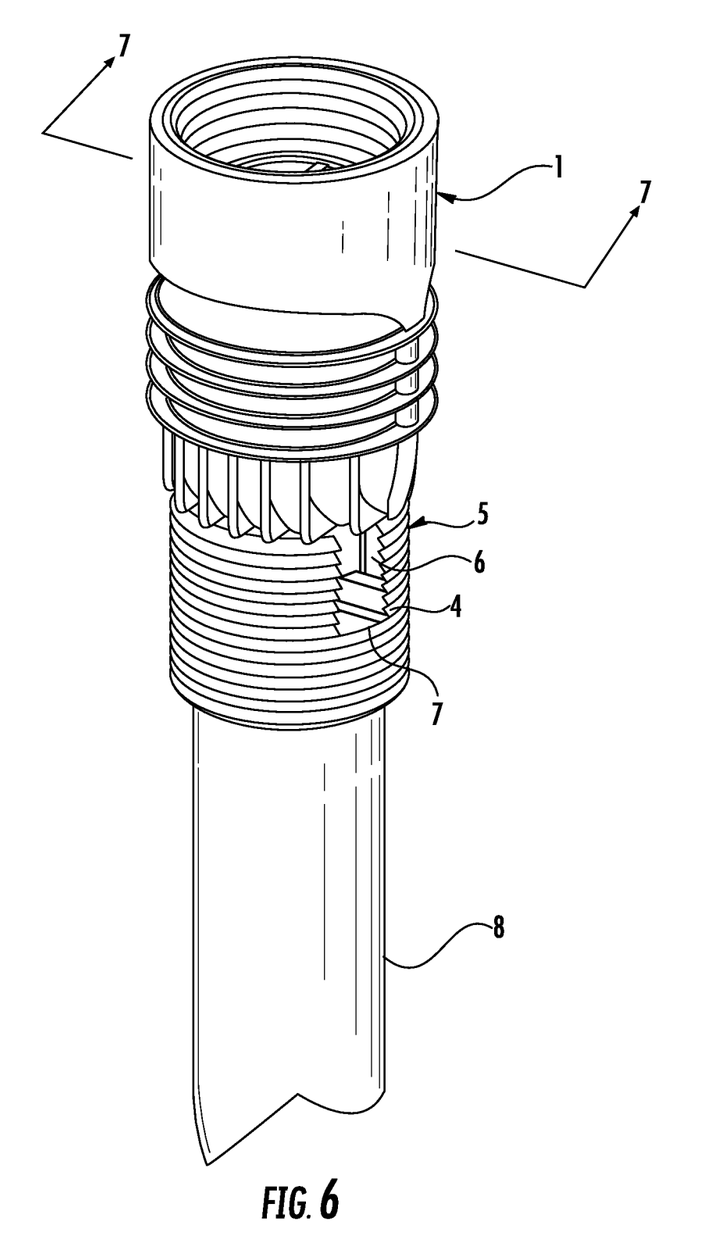
FIG. 6 shows the shower nozzle and nozzle attachment of FIG. 1 in a fully connected state using a bayonet connector.
Figure 7:
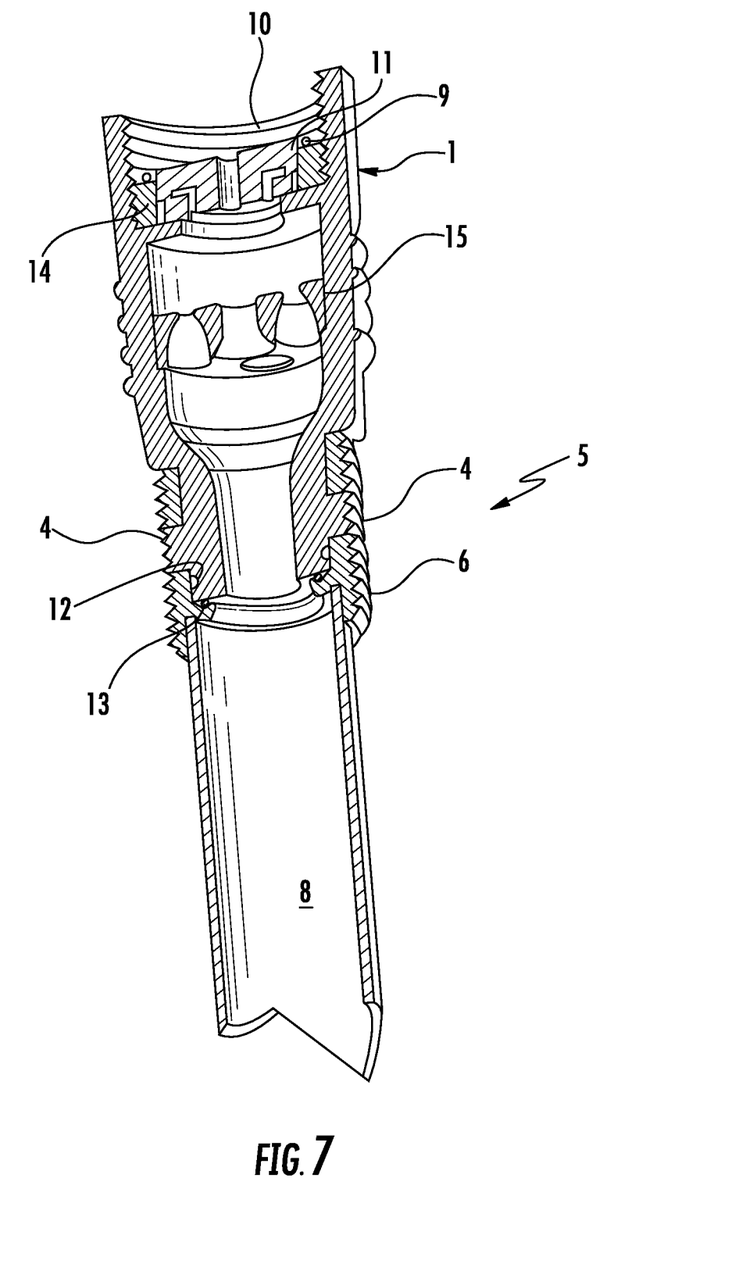
FIG. 7 illustrates a cross-sectional view of the shower nozzle and nozzle attachment taken generally along line 7-7 of FIG. 6.

A cross-sectional view of the connected shower nozzle 1 and the nozzle attachment 5 arrangement of FIG. 6 is illustrated in FIG. 7. The relative positioning of the pins 4 of the male slide part of the bayonet connector within the circumferential slot ends 7 of the female bayonet receptor defined by the nozzle attachment 5 is clearly shown. The relative arrangement and positioning of the internal components of the shower nozzle 1, such as the sealing rings 9, 12, 13, the aerator 11, and the fluid flow limiter 15, is clearly visible.

Figure 8:
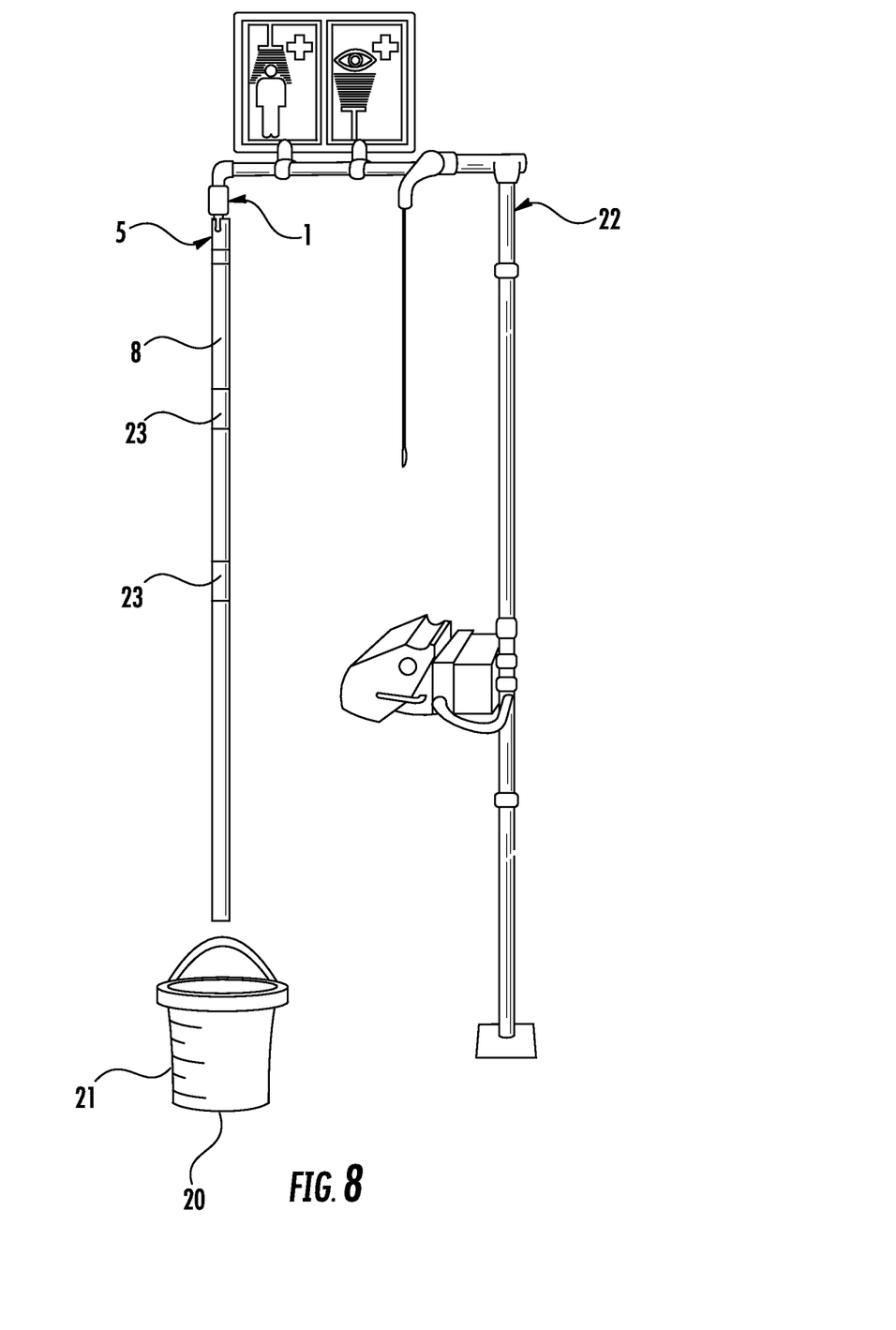
FIG. 8 schematically illustrates a use of the shower nozzle and nozzle attachment in conjunction with an emergency shower system.

FIG. 8 schematically illustrates a first embodiment of a use of the shower nozzle 1 and shower attachment 5 in connection with the water outlet of an emergency shower system 22. In order to provide effective and reliable emergency washing capabilities, emergency showers are typically required to output a minimum, or a specified, rate of water flow in use. This specified rate must be the rate measured when the emergency shower system has in place a shower nozzle which will be used in general (i.e., emergency) use of the emergency shower. Shower nozzles 1 are often required to incorporate a flow restrictor 15. As a result, attempts to accurately measure the rate of water flow in a fully assembled and ready-to-use emergency shower system can be extremely messy and difficult. A first use of the shower nozzle 1 addresses this problem.

By employing a shower nozzle 1 as the terminal nozzle of the emergency shower system 22, the bayonet connector of the nozzle may connect to the female bayonet receptor part of the nozzle attachment 5 to which an extended pipe 8 is connected in fluid communication. The pipe is telescopically extendable/adjustable in length and comprises three length sections adjustably and slidingly connected to one another via sliding clamp grips 23 known to those skilled in the art. In use, the nozzle attachment 5 may be connected to the bayonet connector of the shower nozzle 1, in situ, thereby to finally connect the pipe 8 to the water outlet end 2 of the shower nozzle. The length of the pipe 8 may be telescopically adjusted as desired such that the terminal output end of the pipe may extend to a position just above the ground surface directly beneath the nozzle 1 of the shower system.

A water capture vessel 20 may be placed on the ground surface directly underneath the terminal output end of the pipe 8. A full flow of water may then be passed through the emergency shower system 22 and out through the nozzle 1 thereof. The output water is then directed through the full length of the pipe 8 connected to the nozzle 1 via the nozzle attachment 5 and into the water capture vessel 20. Regular markings 21 formed on the side or inner surface of the water capture vessel 20 may permit the user to measure the quantity of water output by the emergency shower system 22 over a specified or predefined period of time. This quantity, divided by the period of time over which it was collected, enables the user to determine a water flow rate with which to assess whether the emergency shower system is compliant with regulatory standards. This process is far less messy than existing methodologies, and is much more accurate since water is not lost and users are less likely to become wet.

The nozzle attachment 5 and the pipe 8 may, when connected to the bayonet connector of the shower nozzle 1, be used as a means of applying mechanical torque to the shower nozzle 1 when attaching or detaching the shower nozzle from the water outlet end of the emergency shower system 22.

Figure 9:
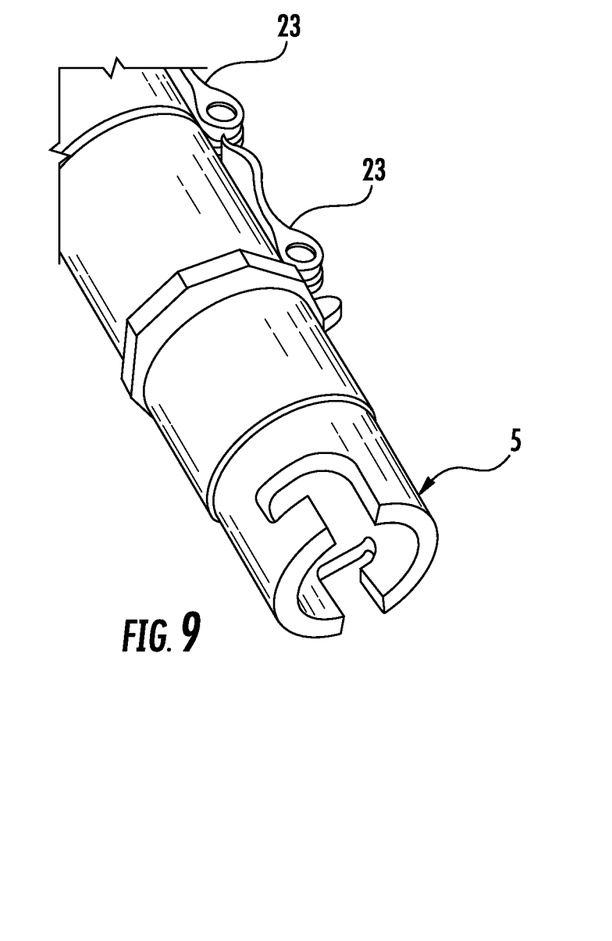
FIG. 9 illustrates an enlarged view of the nozzle attachment according to an embodiment of the invention.
Figure 10:
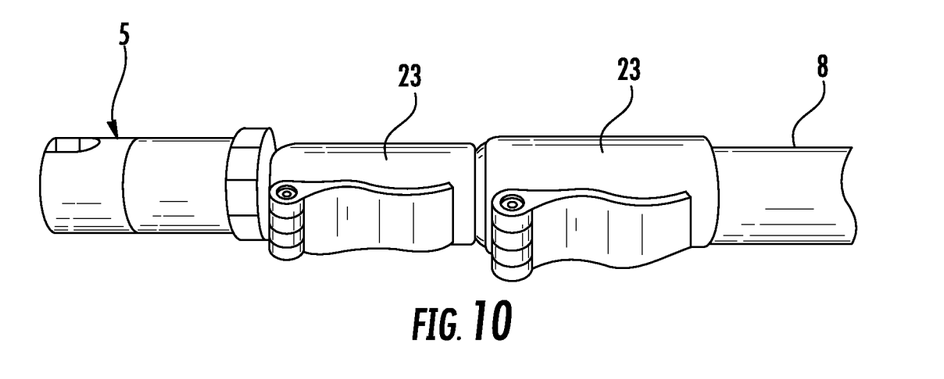
FIG. 10 illustrates a side view of the nozzle attachment and the clamp grips.

FIGS. 9 and 10 illustrate in greater detail the elements of the nozzle attachment 5 and pipe 8 connected to it, including the mechanical or clamp grips 23 permitting telescopic adjustability.

Figure 11:
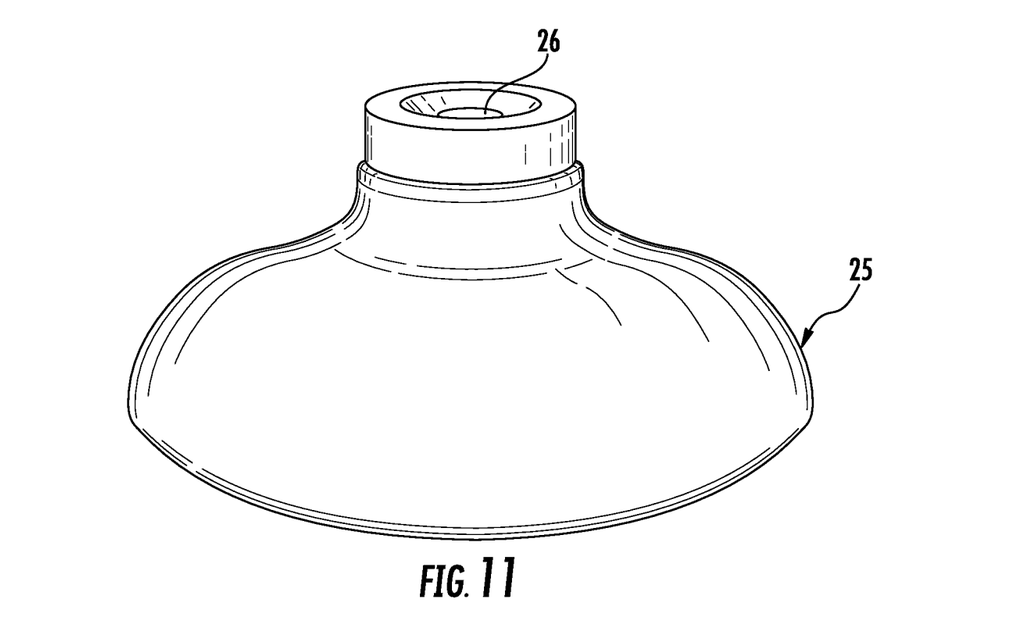
FIG. 11 illustrates a side view of a shower head unit.
Figure 12:
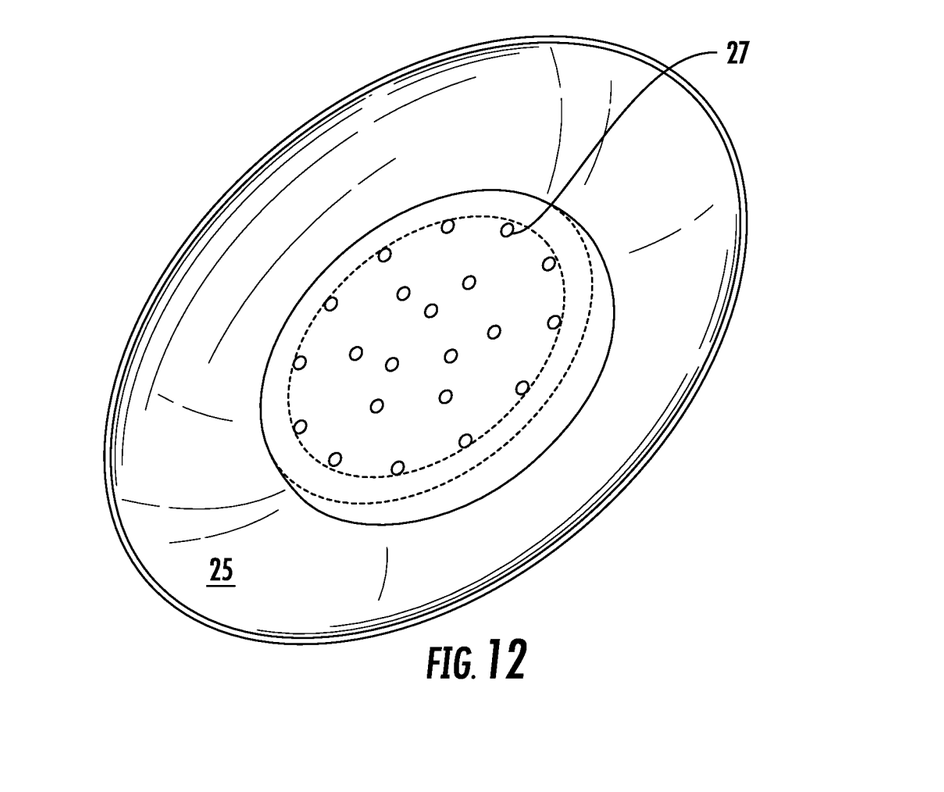
FIG. 12 illustrates a bottom view of the shower bead unit of FIG. 11.

FIGS. 11 and 12 illustrate a shower head unit 25, also commonly known as a shower rose, which comprises a water inlet opening 26 located at a top end of the shower head unit that defines a water inlet conduit in fluid communication with a plurality of water outlet openings 27 arranged across a lower end surface of the shower head unit. The cylindrical inner walls of the water inlet conduit 26 may include a threaded surface, as is common with such shower head units 25, for interfacing with a reciprocally threaded outer cylindrical surface of a shower nozzle 1. This threaded interface permits the shower head unit 25 to be readily connected to a shower nozzle and to a shower system 22 for use in dispersing a spread or spray of water in a controlled manner.

Figure 13:
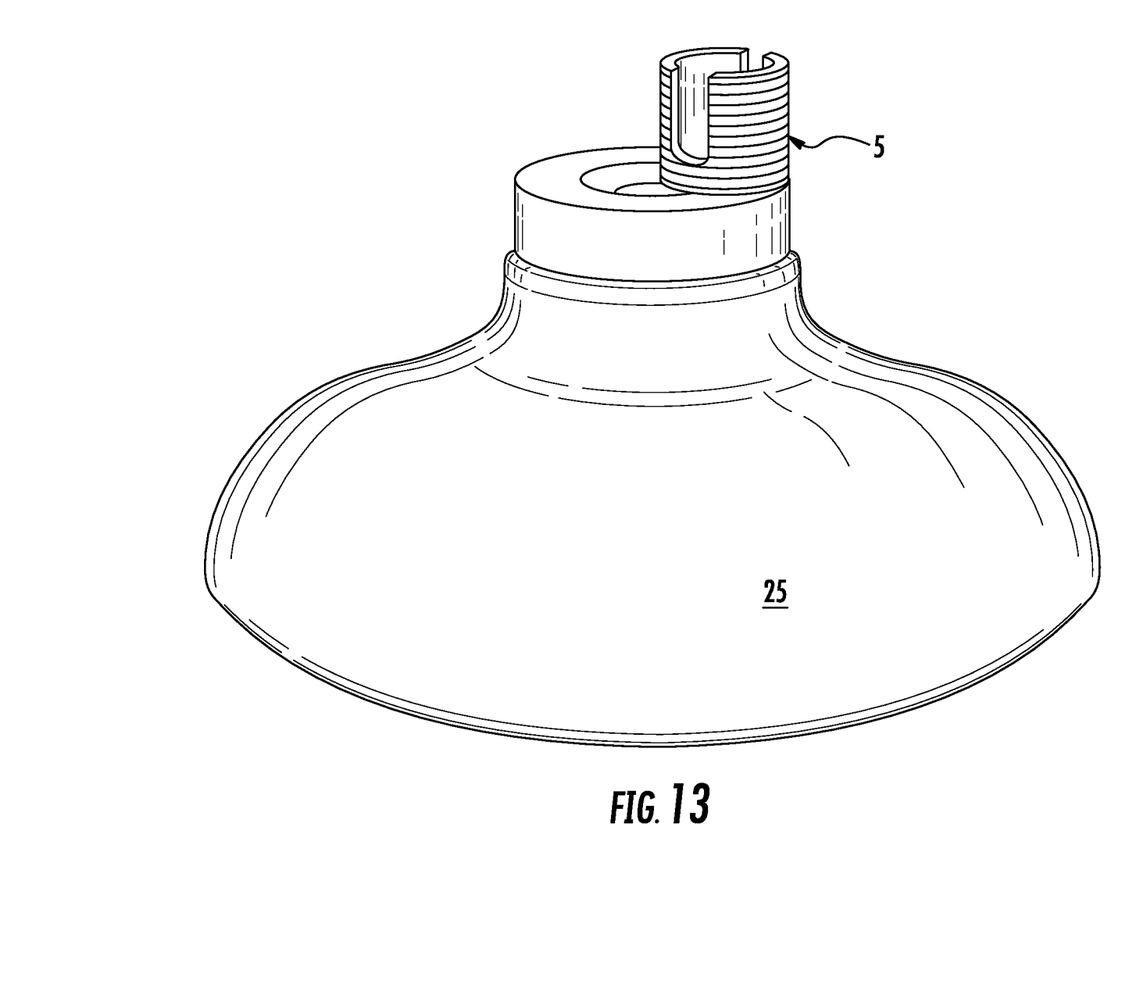
FIG. 13 illustrates a side view of the shower head unit of FIGS. 11 and 12, together with a nozzle attachment.

FIG. 13 illustrates a second use of the nozzle attachment 5 in conjunction with the shower nozzle 1 described above. In particular, the external cylindrical surface of the nozzle attachment 5 may be threaded in a manner which mates with the internal threading provided on the inner cylindrical surface of the water inlet conduit of the shower head unit 25. It is to be noted that the nozzle attachment 5 in this example does not have connected to it the telescopically adjustable pipe 8 described above. Rather, the nozzle attachment 5, according to this embodiment, may be used without additional attachments.

Figure 14:
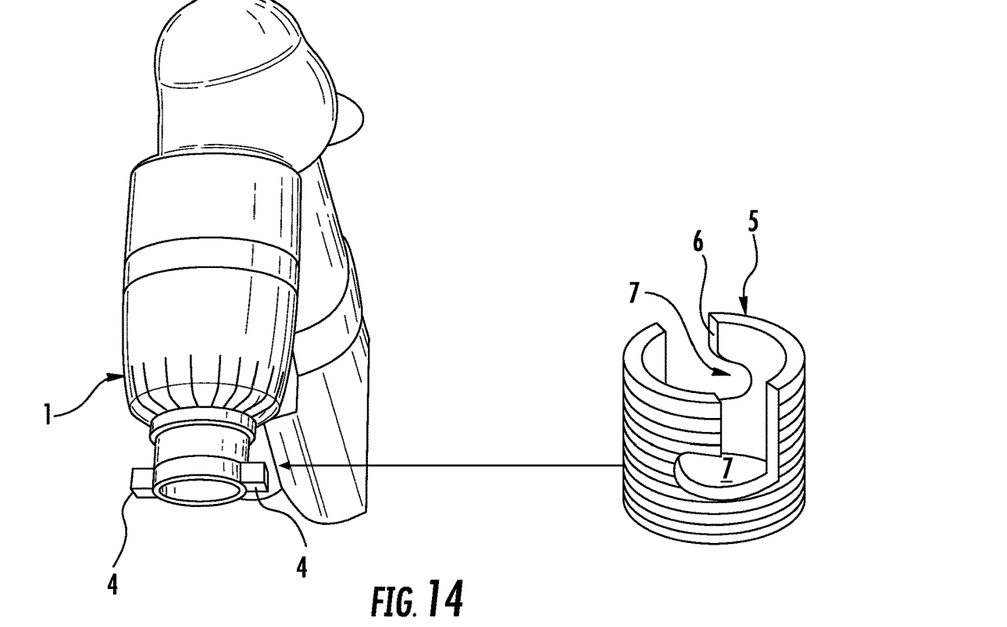
FIG. 14 schematically illustrates the use of a shower nozzle and a nozzle attachment according to an embodiment of the invention.
Figure 15:
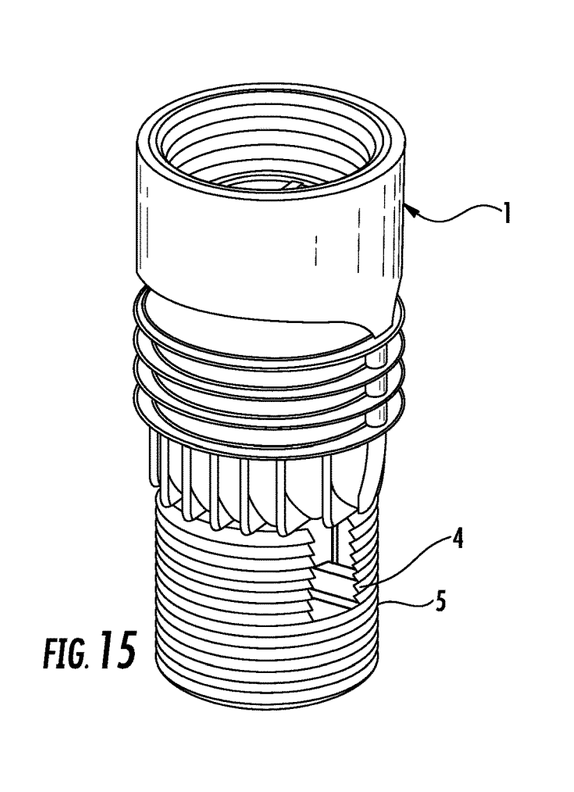
FIG. 15 illustrates an assembly of a shower nozzle and nozzle attachment according to an embodiment of the invention.

Referring to FIG. 14, the nozzle attachment 5 may be connected to the male sliding part of the bayonet connector of the shower nozzle 1, in the manner described above, such that the projecting pins 4 of the bayonet connector are slid into and along the slots 6 of the nozzle attachment and into each circumferential slot 7 by a twist action. The result is shown in FIG. 15 whereby the outwardly extending pins 4 of the bayonet connector are captured or enclosed within the circumferential slots 7 such that the terminal ends of the pins are either recessed below the outermost threaded cylindrical surface of the nozzle attachment 5, or are no more than flush with that surface. In the example illustrated in FIG. 15, the terminal or radially outer end surfaces of each of the two opposed pins 4 of the bayonet connector of the nozzle 1 possess a threaded formation which matches the threading of the outermost cylindrical surface of the nozzle attachment 5 when the pins are positioned in the circumferential slots 7 of the nozzle attachment.

With the nozzle attachment 5 in place, as shown in FIG. 15, the shower head unit, or shower rose 25 may be attached to the shower nozzle 1 via the nozzle attachment serving as an interface between the two components. In this way, the bayonet connector of the shower nozzle 1 may form a portion of a threaded connector using the nozzle attachment 5 to allow a threaded connection between the nozzle and the shower head unit 25.

Figure 16A:
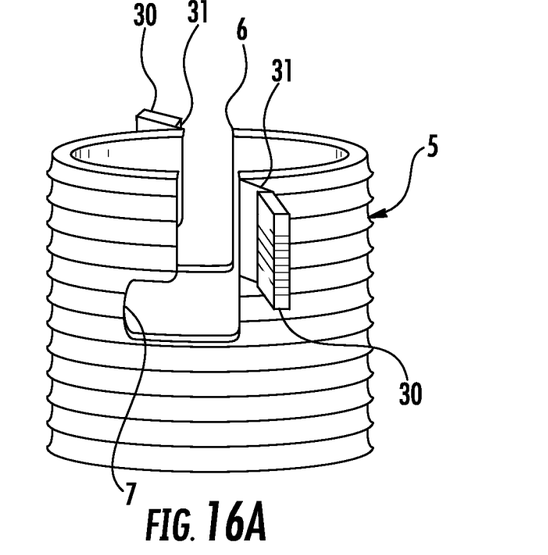
FIG. 16A illustrates a nozzle attachment and lock parts in an open position.
Figure 16B:
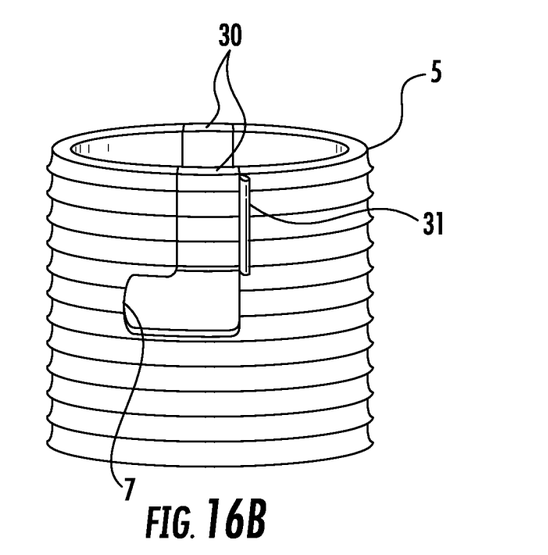
FIG. 16B illustrates the nozzle attachment of FIG. 16A but with the lock parts in a closed or locked position.

Referring to FIGS. 16A and 16B, in order to permit is greater degree of attachment security when the nozzle attachment 5 is attached to the bayonet connector of the nozzle 1, the nozzle attachment may be modified to include one or more lock parts 30. Each lock part 30 is movably attached to the nozzle attachment 5 for removable placement in a respective one of the two slots 6 for obstructing extraction of a pin 4 of the bayonet connector of the shower nozzle 1, when the pin is located within the circumferential portion 7 of a slot. Each lock part 30 may desirably be formed of the same material employed to form the nozzle attachment (e.g., a firm plastic material, or the like). Each lock part 30 may comprise a generally square or rectangular block of such material movably joined to an adjacent peripheral edge of the slot 6 between the opening of the slot and the start of the circumferential portion 7 of the slot, by a malleable strip 31. The malleable strip 31 may itself be formed of the same material as the nozzle attachment 5 and the lock part 30 (e.g., a plastic material).

The dimensions of the square or rectangular block of a lock part 30 may be selected to closely match the width and length of the longitudinal slot 6 preceding the circumferential portion 7 of the slot, and to have a thickness which substantially matches the thickness of the cylindrical wall of the nozzle attachment 5. With this configuration, a lock part 30 may be moved from an open position, as illustrated in FIG. 16A in which full access to each of the two opposed slots 6 is available, to a closed position, as illustrated in FIG. 16B in which such access is prevented. In the closed state, the lock parts 30 prevent removal of the pins 4 of the bayonet connector from the circumferential slots 7 and, therefore, lock the nozzle attachment 5 in place within the bayonet connector of the shower nozzle 1. The lock parts 30 may be moved between. the closed state illustrated in FIG. 16B and the open state as illustrated in FIG. 16A by manual manipulation of the lock parts. However, such manual manipulation is prevented when the locked nozzle attachment 5 is positioned on the shower nozzle 1 and the shower head unit 25 is hilly threaded on the nozzle attachment such that the lock parts 30 are covered by the cylindrical inner walls of the water inlet opening 26 of the shower head unit. This provides a greater level of mechanical security between components.

As may be understood, the shower nozzle 1 comprises a water outlet part 3 for directing a flow of water out of the nozzle, and the water outlet part includes an outer surface defining a male slide part of a bayonet connector for insertion into a female bayonet receptor part of a nozzle attachment 5. The outer surface of the water outlet part 3 includes at least one pin 4 extending substantially radially therefrom. The shower nozzle 1 permits a nozzle attachment 5 to be detachably connected to the nozzle in a simple but versatile way which allows suitable water flow control components (e.g., a pipe) to be coupled to the nozzle to assist in flow rate measurements. The nozzle attachment 5 is also configured to permit a shower head to be attached thereto. For example, a shower head unit 25 may be attached to a shower nozzle 1 via the bayonet connector of the nozzle, and may be disconnected from the shower nozzle. A water flow control attachment (e.g., a flow pipe 8) may then be attached to the shower nozzle for water flow rate measurements in order to control and constrain output water for collection. Once water flow rate measurements are complete, the flow control attachment may be disconnected from the shower nozzle 1 and the shower head unit 25 may be reconnected to the shower nozzle.

The outer surface of the water outlet part 3 may include two pins 4 that extend substantially radially outward respectively from diametrically opposite sides of the outer surface. The use of two pins 4 may improve the mechanical strength of the connection. In some embodiments, the length of the pins 4 is such that it does not project beyond, or stand proud from, the outer periphery of a slot 6, 7 formed in the female receptor part when located therein, such as by connection of the bayonet connector to the nozzle attachment 5. The radial outer end surface of the pins 4 may be substantially flush with the outer periphery of the slot 6, 7 of the nozzle attachment 5 when in use. The length of the pin 4 may be less than or substantially equal to the thickness of the wall of the nozzle attachment 5 in which the slot 6, 7 is formed or cut. The outer surface of the water outlet part 3 of the shower nozzle 1 may include a substantially circular or cylindrical surface dimensioned and arranged to be received intimately into a reciprocally slumped part of the female bayonet receptor part so as to accurately position the former within the latter. Through such a configuration, the ends of the pins 4 may also be accurately positioned relative to the outermost peripheral slot edges at the outer surface of the nozzle attachment 5 (e.g., to be flush with or recessed below the slot edges).

The nozzle attachment 5 may be removably attachable to the shower nozzle 1 through a female bayonet receptor part that includes one or more longitudinal slots 6 with a circumferential slot or serif 7 for receiving one of the pins 4 when the pin is inserted into the female bayonet receptor part of a nozzle attachment. For example, each of the slots may comprise a first substantially linear or curvilinear slot portion 6 containing the slot opening, in communication with a second substantially linear or curvilinear slot portion defining the circumferential slot or serif 7. The first slot portion 6 may extend longitudinally in a direction generally parallel to the longitudinal axis of the nozzle attachment 5, and the second slot portion 6, 7 may extend away from the first slot portion transversely or circumferentially, The first and second slot portions may extend in respective directions which subtend an acute angle not exceeding about 90° where the first and second slot portions meet.

The female bayonet receptor part may comprise one or more lock parts 30 moveably attached thereto fin removable placement in a respective one of the one or more slots 6. The lock parts 30 may be dimensioned and arranged to obstruct extraction of a pin 4 from the circumferential slot 7 when the male slide part and female bayonet receptor part are connected. This structure permits the bayonet connector to be held or secured in place in the female bayonet receptor. The lock part 30 may be a portion of solid material and may be dimensioned to closely fit into a respective slot 6 between the entrance of the slot and its terminating circumferential slot 7. A lock part 30 may be attached to the body of the receptor via a malleable web, strip or flap 31 of material (e.g., a plastic) connecting the two. The malleable web, strip or flap 31 may be integrally formed with the female receptor part, as may the lock part (e.g., as a molding). The lock part 30 may be formed of the same material as the receptor part. The thickness of the lock parts 30 may substantially match, or does not exceed, the thickness of the part of the wall of the female bayonet receptor part in which the associated slot 5 is formed or cut. This configuration provides that the lock part 30 does not stand proud of the receptor part when in use. This may be particularly useful in embodiments where the outer surface of the female receptor part is intended to form a close, intimate and/or sliding interface with another component.

The nozzle attachment 5 may be connected to a shower head unit 25 comprising a water inlet conduit 26 in fluid communication with a plurality of water outlets 27. The inner conduit surface 26 may be threaded to define a female connector part removably attachable to a threaded portion of the nozzle attachment to place the shower nozzle in fluid communication with the water outlets of the shower head unit 25. Thus, the bayonet connector of the shower nozzle 1 and nozzle attachment 5 may also function as a threaded connector for connecting a threaded shower head unit for regular shower functions.

The shower nozzle 1 may interconnect with the nozzle attachment 5 to establish fluid communication with a pipe 8 for directing a flow of water out of the nozzle. The pipe 8 may be dimensioned or arranged to enable the output flow of water from a shower unit 22 to be directed for collection during flow rate measurements.

The pipe 8 may be substantially solid. The pipe 8 may be telescopically adjustable in length.

The shower nozzle 1 and nozzle attachment 5 may be distributed and/or sold as an apparatus in kit form.

The kit of parts may also include a shower head unit 25 comprising a water inlet conduit 26 in fluid communication with a plurality of water outlets 27, wherein the inner conduit surface is threaded thereby defining a female connector part for removably receiving a threaded male connector to place the shower nozzle in fluid communication with the water outlets of the shower head.

The kit of parts may also include a pipe 8 for directing a flow of water out of the nozzle. The pipe 8 may be substantially solid and/or may be telescopically adjustable in length.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. the use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A shower nozzle assembly comprising:
    a shower nozzle defining an internal bore having a water inlet opening and a water outlet part spaced from the water inlet opening, the water outlet part terminating at a water outlet opening and being configured to direct a flow of water from the water inlet opening out of the shower nozzle via the water outlet opening, the water inlet opening being in fluid communication with the water outlet opening;
    a nozzle attachment having an inner surface defining a through bore configured to receive the water outlet part therein; and
    a bayonet connection for securing the nozzle attachment to the shower nozzle, the bayonet connection including a radial projection and a female bayonet receptor part configured to receive the radial projection therein to secure the shower nozzle to the nozzle attachment;
    wherein the water outlet part of the shower nozzle includes an outer surface, the radial projection extending radially outward from the outer surface of the water outlet part, and the radial projection having a threaded end surface;
    wherein the nozzle attachment comprises an outer surface and includes the female bayonet receptor part, the outer surface of the nozzle attachment comprises an external threaded surface, the female bayonet receptor part comprising a through slot extending radially from the inner surface defining the through bore through the outer surface of the nozzle attachment, the through slot configured to slidably receive the radial projection of the shower nozzle when the water outlet part is inserted into the through bore of the nozzle attachment, the through slot including a longitudinal slot portion and a circumferential slot portion;
    wherein the threaded end surface of the radial projection is aligned with the external threaded surface of the outer surface of the nozzle attachment when the radial projection is slidably received in the through slot of the nozzle attachment, the circumferential slot portion being configured to receive therein the radial projection when the shower nozzle and the nozzle attachment are interconnected via the bayonet connection.

2. The shower nozzle assembly according to claim 1, wherein the longitudinal slot portion of the through slot of the nozzle attachment extending extends longitudinally along a longitudinal axis of the through bore of the nozzle attachment from an endmost edge of the nozzle attachment defining an opening of the through bore to an intermediate end portion of the longitudinal slot portion, the circumferential slot portion is in communication with the intermediate end portion of the longitudinal slot portion, and the circumferential slot portion extends circumferentially from the intermediate end portion of the longitudinal slot portion to a circumferential slot end.

3. The shower nozzle assembly according to claim 1, wherein the outer surface comprises two projections extending radially outward respectively from diametrically opposite sides of the outer surface, and the female bayonet receptor part comprises two through slots configured to slidably receive, respectively, the projections of the shower nozzle therein when the water outlet part is inserted into the through bore of the nozzle attachment.

4. The shower nozzle assembly according to claim 3, wherein each of the through slots of the nozzle attachment includes a longitudinal slot portion and a circumferential slot portion, the longitudinal slot portion extending longitudinally along a longitudinal axis of the through bore of the nozzle attachment from an endmost edge of the nozzle attachment defining an opening of the through bore to an intermediate end portion of the longitudinal slot portion, the circumferential slot portion in communication with the intermediate end portion of the respective longitudinal slot portion, the circumferential slot portion extending circumferentially from the intermediate end portion of the respective longitudinal slot portion to a circumferential slot end, the circumferential slot portion configured to receive therein a respective one of the radial projections when the shower nozzle and the nozzle attachment are interconnected via the bayonet connection.

5. The shower nozzle assembly according to claim 1, wherein the female bayonet receptor part comprises a lock part moveably attached thereto for removable placement in a slot of the female bayonet receptor part to obstruct removal of the projection from the slot when the shower nozzle and nozzle attachment are interconnected.

6. The shower nozzle assembly according to claim 1, further comprising a shower head unit comprising:
    a water inlet conduit in fluid communication with a plurality of water outlets, wherein the water inlet conduit is configured to be removably attached to the nozzle attachment.

7. The shower nozzle assembly according to claim 6, wherein the water inlet conduit comprises a threaded inner surface configured to matingly receive the threaded surface of the nozzle attachment to place the shower nozzle in fluid communication with the water outlets of the shower head unit.

8. The shower nozzle assembly according to claim 1, further comprising:
    a pipe fluidly connected to the nozzle attachment for directing a flow of water out of the shower nozzle.

9. The shower nozzle assembly according to claim 8, wherein the pipe is telescopically adjustable in length.

10. The shower nozzle assembly according to claim 8, further comprising:
   a sealing ring circumscribing a base of an end of the pipe connected to the nozzle attachment, the sealing ring providing a water seal between the pipe and the nozzle attachment.

11. The shower nozzle assembly according to claim 1, further comprising:
   a sealing ring extending circumferentially around the outer surface of the water outlet part and being arranged to engage the through bore of the nozzle attachment when the shower nozzle and the nozzle attachment are interconnected via the bayonet connection.

12. The shower nozzle assembly according to claim 1, further comprising:
   a fluid aerator part disposed at least partially within the internal bore of the shower nozzle, the fluid aerator part arranged in fluid communication with the water inlet opening of the shower nozzle such that the flow of water from the water inlet opening out of the shower nozzle via the water outlet opening passes through the fluid aerator part.

13. The shower nozzle assembly according to claim 1, further comprising:
   a flow limiter disposed at least partially within the internal bore of the shower nozzle, the flow limiter arranged in fluid communication with the water inlet opening of the shower nozzle such that the flow of water from the water inlet opening out of the shower nozzle via the water outlet opening passes through the flow limiter.

14. The shower nozzle assembly according to claim 13, further comprising:
   a fluid aerator part disposed at least partially within the internal bore of the shower nozzle, the fluid aerator part arranged in fluid communication with the water inlet opening of the shower nozzle and the flow limiter such that the flow of water from the water inlet opening out of the shower nozzle via the water outlet opening passes through the flow limiter and the fluid aerator part with the flow limiter interposed between the water inlet opening and the fluid aerator part.

* * * * *